US008180636B2

(12) United States Patent
Droppo et al.

(10) Patent No.: US 8,180,636 B2
(45) Date of Patent: May 15, 2012

(54) PITCH MODEL FOR NOISE ESTIMATION

(75) Inventors: James G. Droppo, Duvall, WA (US); Alejandro Acero, Bellevue, WA (US); Luis Buera, Zaragoza (ES)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/042,000

(22) Filed: Mar. 7, 2011

(65) Prior Publication Data

US 2011/0161078 A1 Jun. 30, 2011

Related U.S. Application Data

(62) Division of application No. 11/788,323, filed on Apr. 19, 2007, now Pat. No. 7,925,502.

(60) Provisional application No. 60/904,313, filed on Mar. 1, 2007.

(51) Int. Cl.
*G10L 15/20* (2006.01)

(52) U.S. Cl. ........................................ 704/233

(58) Field of Classification Search .................. 704/233
See application file for complete search history.

(56) References Cited

U.S. PATENT DOCUMENTS

| | | | | |
|---|---|---|---|---|
| 6,226,606 | B1 | 5/2001 | Acero | |
| 6,985,858 | B2 * | 1/2006 | Frey et al. | 704/233 |
| 7,165,026 | B2 * | 1/2007 | Acero et al. | 704/226 |
| 7,310,599 | B2 * | 12/2007 | Frey et al. | 704/233 |
| 7,447,630 | B2 | 11/2008 | Liu | |
| 7,451,083 | B2 * | 11/2008 | Frey et al. | 704/233 |
| 7,499,686 | B2 | 3/2009 | Sinclair | |
| 7,574,008 | B2 | 8/2009 | Zhang | |
| 7,596,494 | B2 | 9/2009 | Kristjansson | |
| 7,610,196 | B2 | 10/2009 | Nongpiur | |
| 7,725,314 | B2 | 5/2010 | Wu | |
| 7,925,502 | B2 * | 4/2011 | Droppo et al. | 704/226 |

OTHER PUBLICATIONS

U.S. Appl. No. 11/788,323, filed Apr. 19, 2007. 30 pages.
U.S. Appl. No. 11/788,323, Prosecution History including Office Action dated Jun. 22, 2010; Amendment filed Sep. 20, 2010; and Notice of Allowance dated Dec. 17, 2010, 19 pages.

* cited by examiner

*Primary Examiner* — Susan McFadden
(74) *Attorney, Agent, or Firm* — Joseph R. Kelly; Westman, Champlin & Kelly, P.A.

(57) ABSTRACT

Pitch is tracked for individual samples, which are taken much more frequently than an analysis frame. Speech is identified based on the tracked pitch and the speech components of the signal are removed with a time-varying filter, leaving only an estimate of a time-varying speech signal. This estimate is then used to generate a time-varying noise model which, in turn, can be used to enhance speech related systems.

13 Claims, 5 Drawing Sheets

PITCH MODEL FOR NOISE ESTIMATION

The present application is a divisional of and claims priority of U.S. patent application Ser. No. 11/788,323, filed Apr. 19, 2007, the content of which is hereby incorporated by reference in its entirety, and is also based on and claims the benefit of U.S. provisional patent application Ser. No. 60/904,313, filed Mar. 1, 2007, the content of which is hereby incorporated by reference in its entirety.

BACKGROUND

Speech recognizers receive a speech signal input and generate a recognition result indicative of the speech contained in the speech signal. Speech synthesizers receive data indicative of a speech signal, and synthesize speech based on the data. Both of these speech related systems can encounter difficulty when the speech signal is corrupted by noise. Therefore, some current work has been done to remove noise from a speech signal.

In order to remove additive noise from a speech signal, many speech enhancement algorithms first make an estimate of the spectral properties of the noise in the signal. One current method by which this is done is to first segment the noisy speech signal into non-overlapping segments that are either speech segments, which contain voiced speech, or non-speech segments, which do not contain voiced speech. Then, only the non-speech segments are used to estimate the spectral properties of the noise present in the signal.

This type of system, however, has several drawbacks. One drawback is that a speech detection algorithm must be used to identify those segments which contain speech and distinguish them from those segments which do not contain speech. This speech detection algorithm usually requires a model of additive noise, which makes the noise estimate problem somewhat circular. That is, in order to distinguish speech segments from non-speech segments, a noise model is required. However, in order to derive a noise model, the signal must be divided into speech segments and non-speech segments. Another drawback is that if the quality of the noise changes during the speech segments, that noise will be entirely missed in the model. Therefore, this type of noise modeling technique is generally only applicable to stationary noises, that have spectral properties that do not change over time.

Another current way to develop a noise model is to also develop a model that reflects how speech and noise change over time, and then to do simultaneous estimation of speech and noise. This can work fairly well when the spectral character of the noise is different from speech, and also when it changes slowly over time. However, this type of system is very computationally expensive to implement and requires a model for the evolution of noise over time. When the noise does not correspond closely to the model, or when the model is inaccurately estimated, this type of speech enhancement fails.

Other, current models that are used in speech tasks perform pitch tracking. These types of models track the pitch in a speech signal and use the pitch to enhance speech. These current pitch-based enhancement algorithms use discrete Fourier transforms. The speech signal is broken into contiguous over-lapping speech segments of approximately 25 millisecond duration. Frequency analysis is then performed on these over-lapping segments to obtain a pitch value corresponding to each segment (or frame). More specifically, these types of algorithms locate peaks in the pitch identified in the 25 millisecond frames. The speech signal will generally have peaks at the primary frequency and harmonics for the speech signal. These types of pitch-based speech enhancement algorithms then select the portions of the noisy speech signal that correspond to the peaks in pitch and use those portions as the speech signal.

However, these types of algorithms suffer from disadvantages as well. For instance, there can be added noise at the peaks which will not be removed from the speech signal. Therefore, the speech signal will still be noisy. In addition, the pitch of the speech is not constant, even over the 25 millisecond analysis frame. In fact, the pitch of the speech signal can vary by several percentage points in that time. Because the speech signal does not contain a constant pitch over the analysis frame, the peaks in the pitch are not sharp, but instead are relatively broad. This leads to a reduction in resolution achieved by the pitch tracker.

The discussion above is merely provided for general background information and is not intended to be used as an aid in determining the scope of the claimed subject matter.

SUMMARY

Pitch is tracked for individual samples, which are taken much more frequently than an analysis frame. Speech is identified based on the tracked pitch and the speech components of the signal are removed with a time-varying filter, leaving only an estimate of a time-varying noise signal. This estimate is then used to generate a time-varying noise model which, in turn, can be used to enhance speech related systems.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
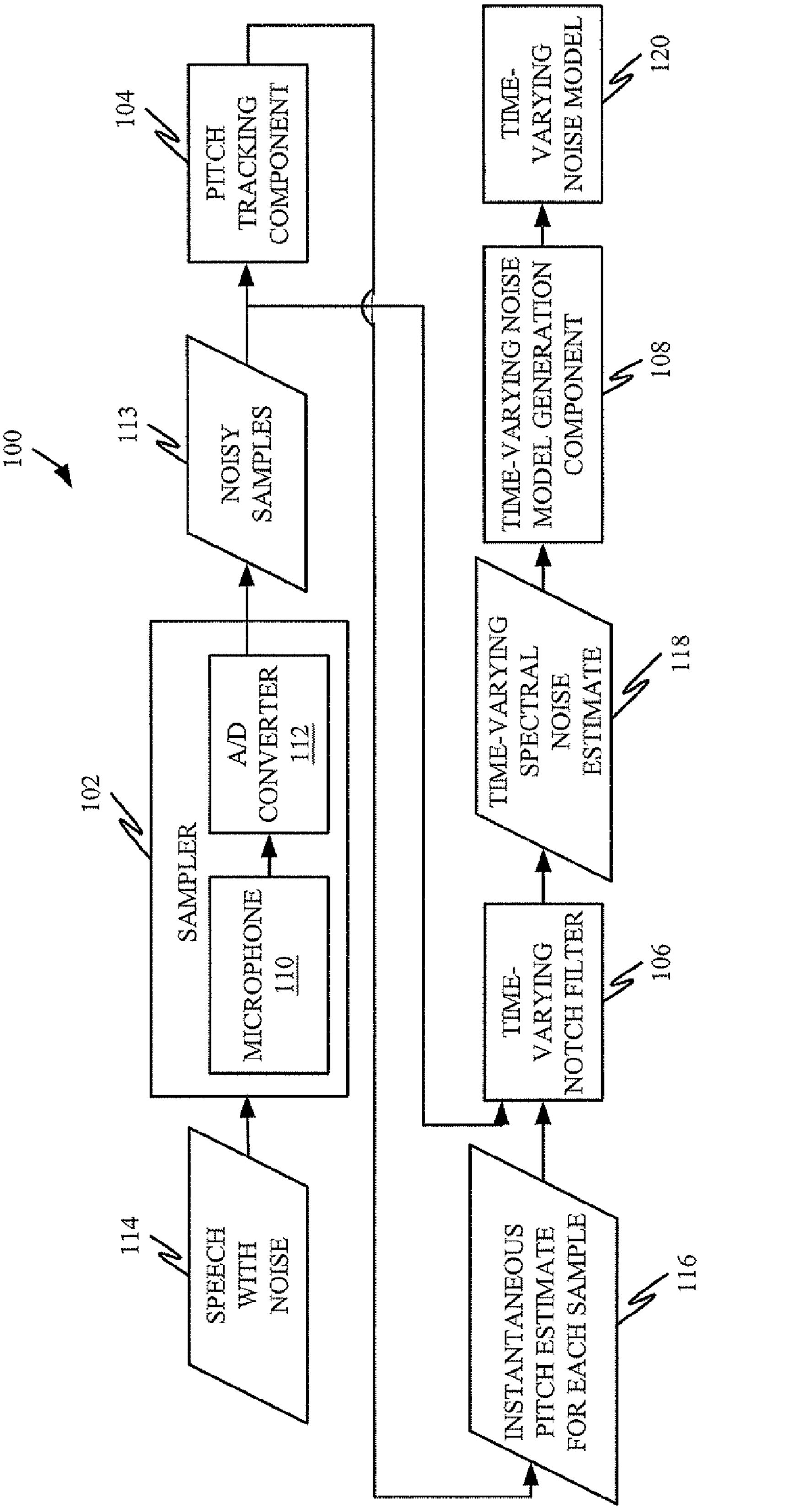
FIG. 1 is a block diagram of a time-varying noise model generation system in accordance with one embodiment.
Figure 2:
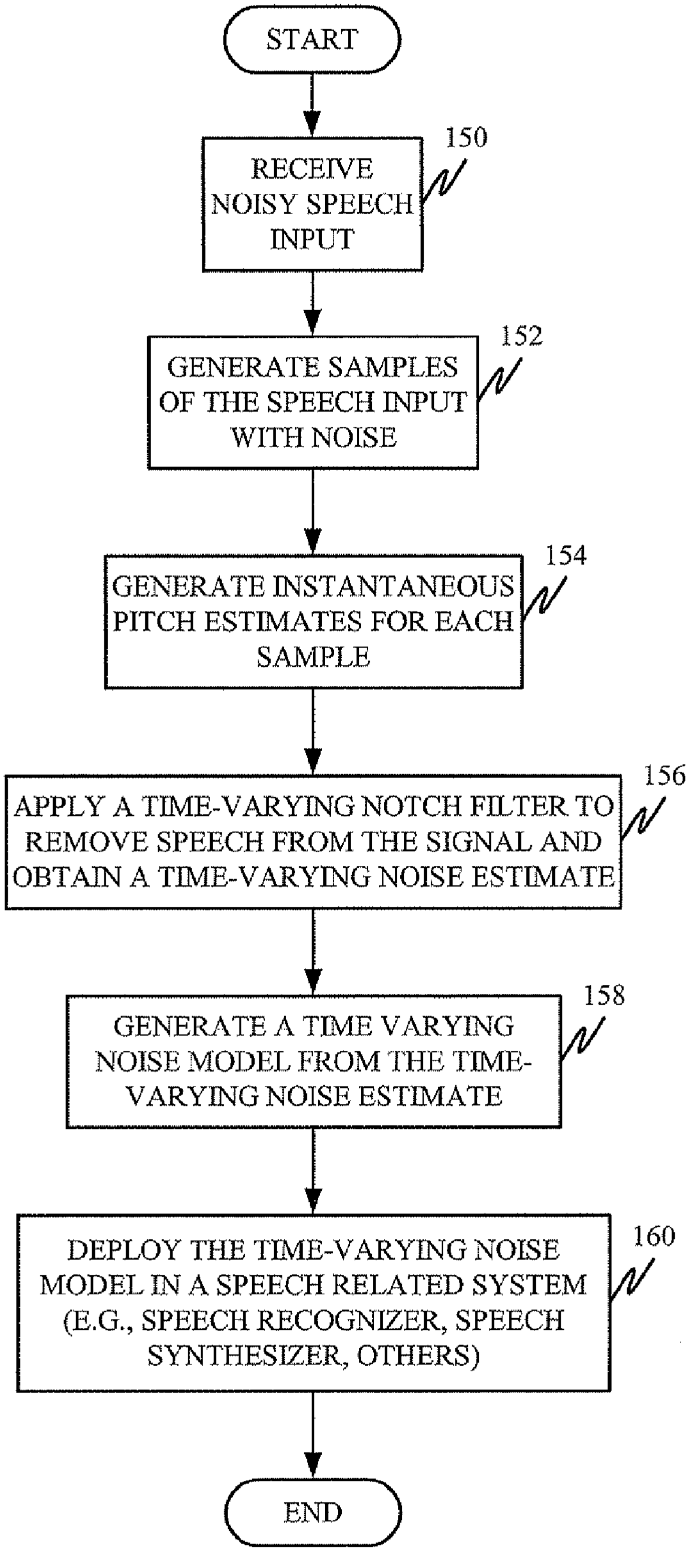
FIG. 2 is a flow diagram illustrating the overall operation of the system shown in FIG. 1.

FIG. 1 is a block diagram of a time-varying noise model generation system 100 in accordance with one embodiment. System 100 includes a sampling component 102, pitch tracking component 104, time-varying notch filter 106, and time-varying noise model generation component 108. Sampler 102 is illustrated in FIG. 1 as including microphone 110 and analog-to-digital (A/D) converter 112. FIG. 2 is a flow diagram illustrating the overall operation of system 100 shown in FIG. 1. FIGS. 1 and 2 will now be described in conjunction with one another.

In one embodiment, system 100 identifies speech in a noisy speech signal and suppresses the speech to obtain a noise signal. The noise signal can then be used to generate a time-varying noise model. Therefore, system 100 first receives a noisy speech input 114 which is provided to sampler 102. A first step in recovering the noise signal from the noisy speech input 114 is to eliminate voiced speech from the noisy speech input 114. Therefore, sampler 102 receives and samples the noisy speech input 114. Receiving the input is indicated by block 150 in FIG. 2 and generating samples is indicated by block 152.

In the embodiment shown in FIG. 1, the noisy speech input is provided to microphone 110. Of course, the speech input may be provided from a human speaker and would thus be provided separately from the additive noise, the additive noise being picked up by the microphone from separate sources. However, the two (speech and noise) are shown as a single input 114, for the sake of simplicity, in FIG. 1. In any case, the audio inputs detected by microphone 110 are converted into electrical signals that are provided to A/D converter 112.

A/D converter 112 converts the analog signal from microphone 110 into a series of digital values. In some embodiments, A/D converter 112 samples the analog signal at 16 kilohertz and 16 bits per sample, thereby creating 32 kilobytes of speech data per second. The samples are thus, in one embodiment, taken approximately every 62.5 microseconds. Of course, other sampling rates can be used as well. These digital values are provided as noisy samples 113 to pitch tracking component 104 and time-varying notch filter 106. Pitch tracking component 104 is illustratively a known constant pitch tracker that analyzes each sample and provides an instantaneous pitch estimate 116 for each sample. Generating the instantaneous pitch estimate for each sample is indicated by block 154 in FIG. 2.

It should be noted that whereas most conventional pitch estimation algorithms assign a single pitch to each analysis frame, those analysis frames are typically formed of a plurality of samples, and have approximately a 25 millisecond duration. In contrast, system 100 assigns an instantaneous pitch estimate much more frequently. In one embodiment, pitch tracking component 104 assigns an instantaneous pitch estimate to each sample, although the invention need not be limited to each sample. Instead, a pitch estimate can be assigned to each small group of samples, such as to 2, 5, or even 10 samples. However, it is believed that the more frequently the pitch tracking component 104 assigns an instantaneous pitch estimate, the better. Also, pitch tracking component 104 assigns an instantaneous pitch estimate for samples at least more frequently than the duration of the analysis frames.

Having thus calculated the pitch estimates for each sample, the speech is eliminated from the noisy samples 113 by applying time-varying notch filter 106. Of course, a variety different time-varying filtering techniques can be used and the notch filter is discussed by way of example only. In one embodiment, time-varying notch filter 106 operates according to equation 1 as follows:

$$y'[n]=y[n]-y[n-\tau_n] \quad \text{Eq. 1}$$

where y'[n] represents the noisy speech signal with voiced speech removed;

y[n] represents the noisy speech signal; and $\tau_n$ represents the instantaneous pitch estimate at each sample n.

It can be seen from the second term on the right side of Eq. 1 that if the signal contains a pitch which is similar to the pitch for speech, time-varying notch filter 106 removes the signal at that pitch, and its harmonics, but passes other frequencies. In other words, any frequency component at time n, with a period of $\tau_n$, and its harmonics, are completely removed from the signal passed through time-varying notch filter 106.

It is important to note that time-varying notch filter 106 actually varies with time. The pitch of a speech signal can vary over time, so filter 106 varies with it.

The sequence of pitches $\tau_n$ is computed from the noisy signal, in one embodiment, by minimizing the objective function set out in Eq. 2 below:

$$F=\sum_n (y[n]-y[n-\tau_n])^2+\gamma\sum_n(\tau_n-\tau_{n-1})^2 \quad \text{Eq. 2}$$

The first term on the right hand side of Eq. 2 is the residual energy left after passing the signal through time-varying notch filter 106. This is minimized and therefore it forces the algorithm to choose a pitch sequence that minimizes the energy in the residual y'[n] from Eq. 1. Time-varying notch filter 106 performs well at eliminating signals that have a coherent pitch. Therefore, this is equivalent to finding and eliminating the voiced speech components in the signal.

The second term on the right hand side of Eq. 2 is a continuity constraint that forces the algorithm to choose a pitch at time n ($\tau_n$) that is close to the pitch $\tau$ at time n−1 ($\tau_{n-1}$). Therefore, the pitch sequence that is chosen is reasonably continuous over time. This is a physical constraint imposed to more closely model human speech, in which pitch tends to vary slowly over time.

The parameter $\gamma$ controls the relative importance of residual signal energy and smooth pitch sequence. This is because if $\gamma$ is set to a very low value, it minimizes the second term of Eq. 2, emphasizing the first term (minimization of the energy in the residual y'[n] from Eq. 1). If $\gamma$ is set to a large number, it will choose a relatively constant value for pitch over time, but not necessarily track the pitch very well. Therefore, $\gamma$ is illustratively set to an intermediate value. Eq. 2 has been observed to not be highly sensitive to $\gamma$. Therefore, in one embodiment, a value of 0.001 can be used, but this value could of course, vary widely. For instance, if the gain of y[n] changes, the relative values of the terms in Eq. 2 change. Similarly, if the sample rate changes, the relative values of those terms will change as well. Thus, $\gamma$ can illustratively be empirically set.

Applying the time-varying notch filter 106 to the noisy samples 113, using the instantaneous pitch estimate for each sample 116 is indicated by block 156 in FIG. 2. The result of applying the time-varying notch filter is to obtain a time-varying spectral noise estimate 118.

Because Eq. 2 is quadratic and first-order Markov in $\tau_n$, it has a single optimum. This optimum can be found using standard dynamic programming search techniques. One modification to conventional searching techniques, which can be useful, is to disallow changes in pitch from time n−1 to time n of greater than 1 sample. However, this constraint is not necessary and other constraints may be employed, as desired.

Estimate 118 is provided to time-varying noise model generation component 108, which generates a time-varying noise model 120. Some current noise models consist of a single Gaussian component, or a mixture of Gaussian components, defined on the feature space. In one illustrative embodiment, the feature space of the present system can be Mel-Frequency Cepstral Coefficients (MFCC) commonly used in today's automatic speech recognition systems.

There are a wide variety of different ways of converting the time-varying spectral noise estimate 118 into a noise model. For instance, there are many possible ways of converting the noise estimate signal 118 into a sequence of MFCC means and covariances which form time-varying noise model 120.

The particular way in which this is done is not important. One way (by way of example only) is to assume that the time-varying noise model 120 includes a time-varying mean feature vector and a time-invariant diagonal covariance matrix. The mean for each frame is taken as the MFCC features from the time-varying spectral noise estimate 118. The covariance can be computed as the variance of these mean vectors over a suitably large segment of the estimate. Of course, this is but one exemplary technique. Generating time-varying noise model 120 from the time-varying noise estimate 118 is indicated by block 158 in FIG. 2. The signal segment size corresponding to each modeled noise estimate in model 120 can be any desired size. In one embodiment, it corresponds the 25 millisecond analysis frames that are commonly used in speech recognizers. Of course, other segment sizes could be used as well.

Once time-varying noise model 120 has been generated for each analysis frame, it can be used, or deployed, in a speech related system, such as a speech recognizer, a speech synthesizer, or other speech related systems. Deploying the time-varying noise model 120 is indicated by block 160 in FIG. 2.

Figure 3:
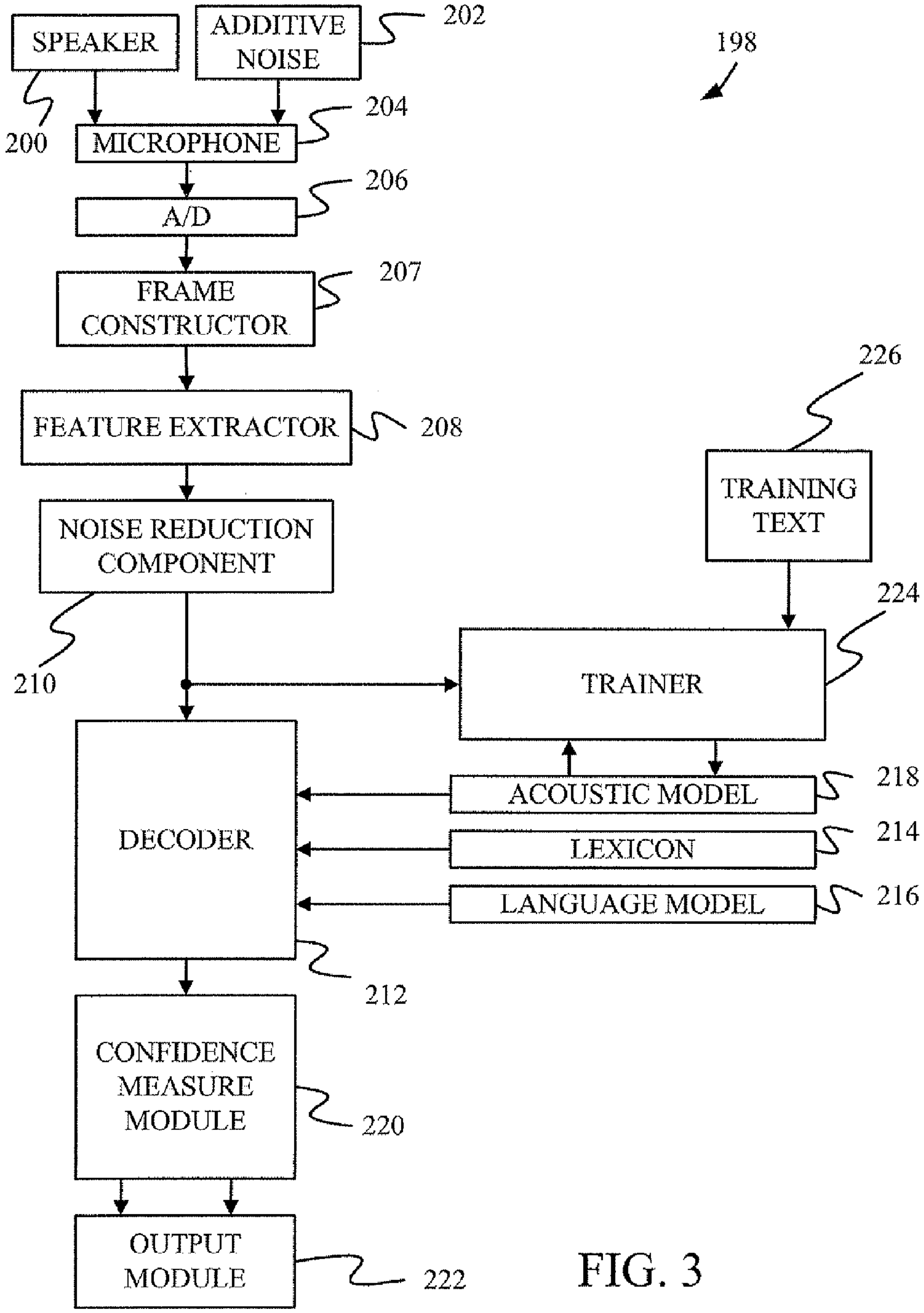
FIG. 3 is a speech recognition system incorporating noise reduction in accordance with one embodiment.

FIG. 3 illustrates a speech recognition system 198 that uses the time-varying noise model 120 in a noise reduction component 210. In FIG. 3, a speaker 200, either a trainer or a user, speaks into a microphone 204. Microphone 204 also receives additive noise from one or more noise sources 202. The audio signals detected by microphone 204 are converted into electrical signals that are provided to analog-to-digital converter 206. Microphone 204 and A/D converter 206 can be those shown in FIG. 1 or different from those.

A/D converter 206 converts the analog signal from microphone 204 into a series of digital values. In several embodiments, A/D converter 206 samples the analog signal at 16 kHz and 16 bits per sample, thereby creating 32 kilobytes of speech data per second. These digital values are provided to a frame constructor 207, which, in one embodiment, groups the values into 25 millisecond analysis frames that start 10 milliseconds apart. Of course, these durations can vary widely, as desired.

The frames of data created by frame constructor 207 are provided to feature extractor 208, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module produces a stream of feature vectors that are each associated with a frame of the speech signal. This stream of feature vectors is provided to noise reduction module 210, which removes noise from the feature vectors.

In the exemplary embodiment being discussed, noise reduction component 210 includes time-varying noise model 120, which is illustratively a Gaussian noise model for each analysis frame. It is composed with a trained speech Gaussian mixture model using the well-studied vector Taylor series speech enhancement algorithm. This algorithm computes, in noise reduction component 210, a minimum mean-square error estimate for the clean speech cepstral features, given a noisy observation and models for the separate hidden noise and clean speech cepstral features.

The output of noise reduction module 410 is a series of "clean" feature vectors. If the input signal is a training signal, this series of "clean" feature vectors is provided to a trainer 424, which uses the "clean" feature vectors and a training text 426 to train an acoustic model 418. Techniques for training such models are known in the art and a description of them is not required for an understanding of the present invention.

If the input signal is a test signal, the "clean" feature vectors are provided to a decoder 412, which identifies a most likely sequence of words based on the stream of feature vectors, a lexicon 414, a language model 416, and the acoustic model 418. The particular method used for decoding is not important to the present invention and any of several known methods for decoding may be used.

The most probable sequence of hypothesis words is provided to a confidence measure module 420. Confidence measure module 420 identifies which words are most likely to have been improperly identified by the speech recognizer, based in part on a secondary acoustic model (not shown). Confidence measure module 420 then provides the sequence of hypothesis words to an output module 422 along with identifiers indicating which words may have been improperly identified. Those skilled in the art will recognize that confidence measure module 420 is not necessary for the practice of the present invention.

Figure 4:
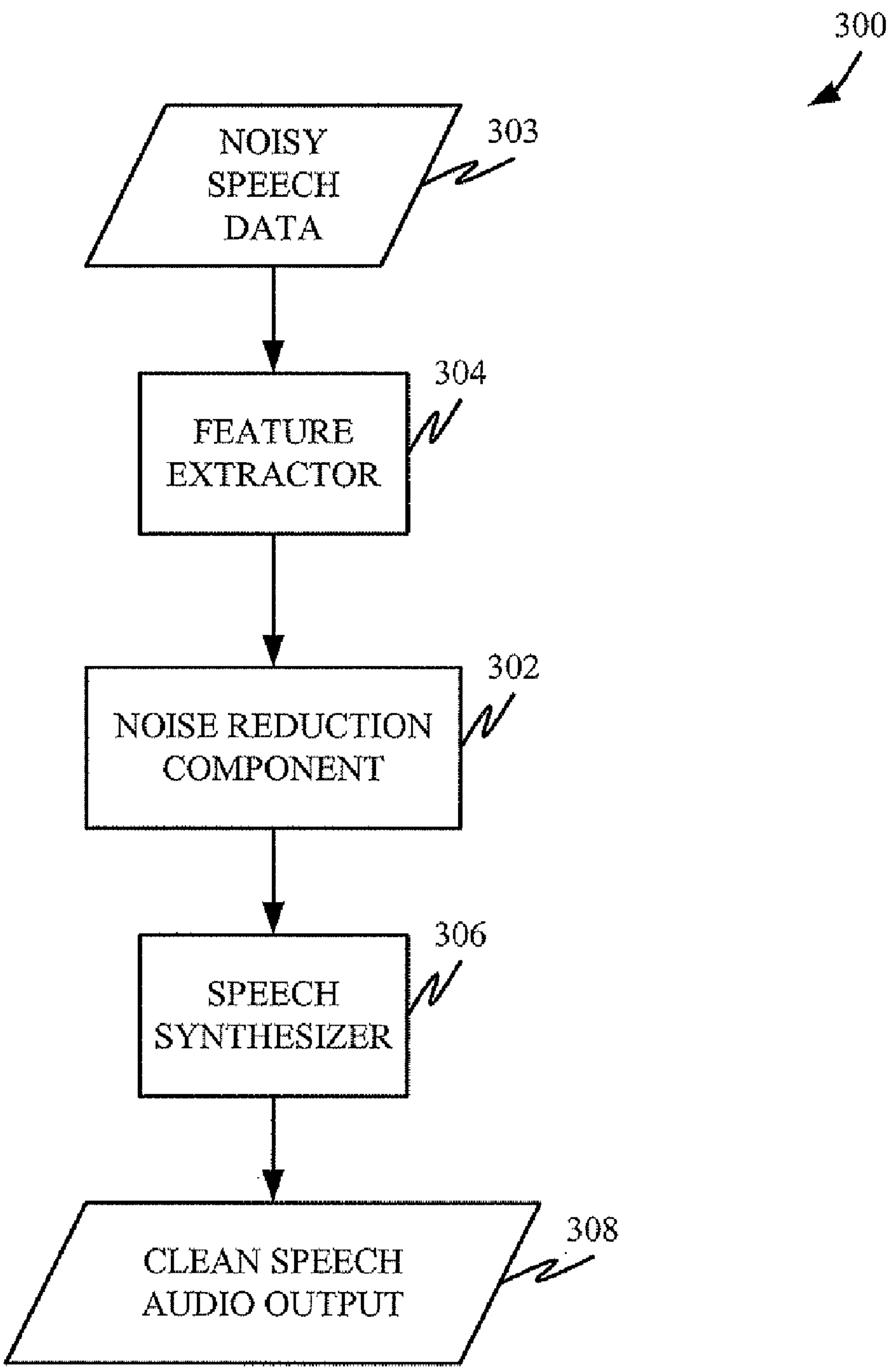
FIG. 4 is a speech synthesis system incorporating noise reduction in accordance with one embodiment.

FIG. 4 is a block diagram of a speech synthesis system 300 that also uses, or deploys, time-varying noise model 120 in a noise reduction component 302. System 100 not only shows noise reduction component 302, but also includes feature extractor 304 and speech synthesizer 306.

Noisy speech data 303 is provided to feature extractor 304 that generates noisy features that are provided to noise reduction component 302. Of course, it will be noted that the noisy speech may well be broken into frames, each of which is approximately 25 milliseconds long (different lengths could be used as well) having a 10 millisecond delay between successive frame starting positions (other values can also be used), such that the frames overlap. The noisy MFCC may illustratively be computed from these frames by feature extractor 304, and are provided to noise reduction component 302. Noise reduction component 302 applies the time-varying noise model 120 and outputs frames of MFCC features that the clean speech might have produced in the absence of the additive noise. By using the corresponding features from the noisy speech and the clean speech estimate, a non-stationary filtering process, that takes a new value each frame, generates a clean speech signal and provides it to speech synthesizer 306. Speech synthesizer 306 then synthesizes the clean speech into an audio output 308. Of course, as with the speech recognition system described in FIG. 3, other co-efficients, other than MFCC could be deployed in speech synthesis system 300 shown in FIG. 4, and those discussed are done so for exemplary purposes only. A list of features that could be used is described above with respect to FIG. 3.

Figure 5:
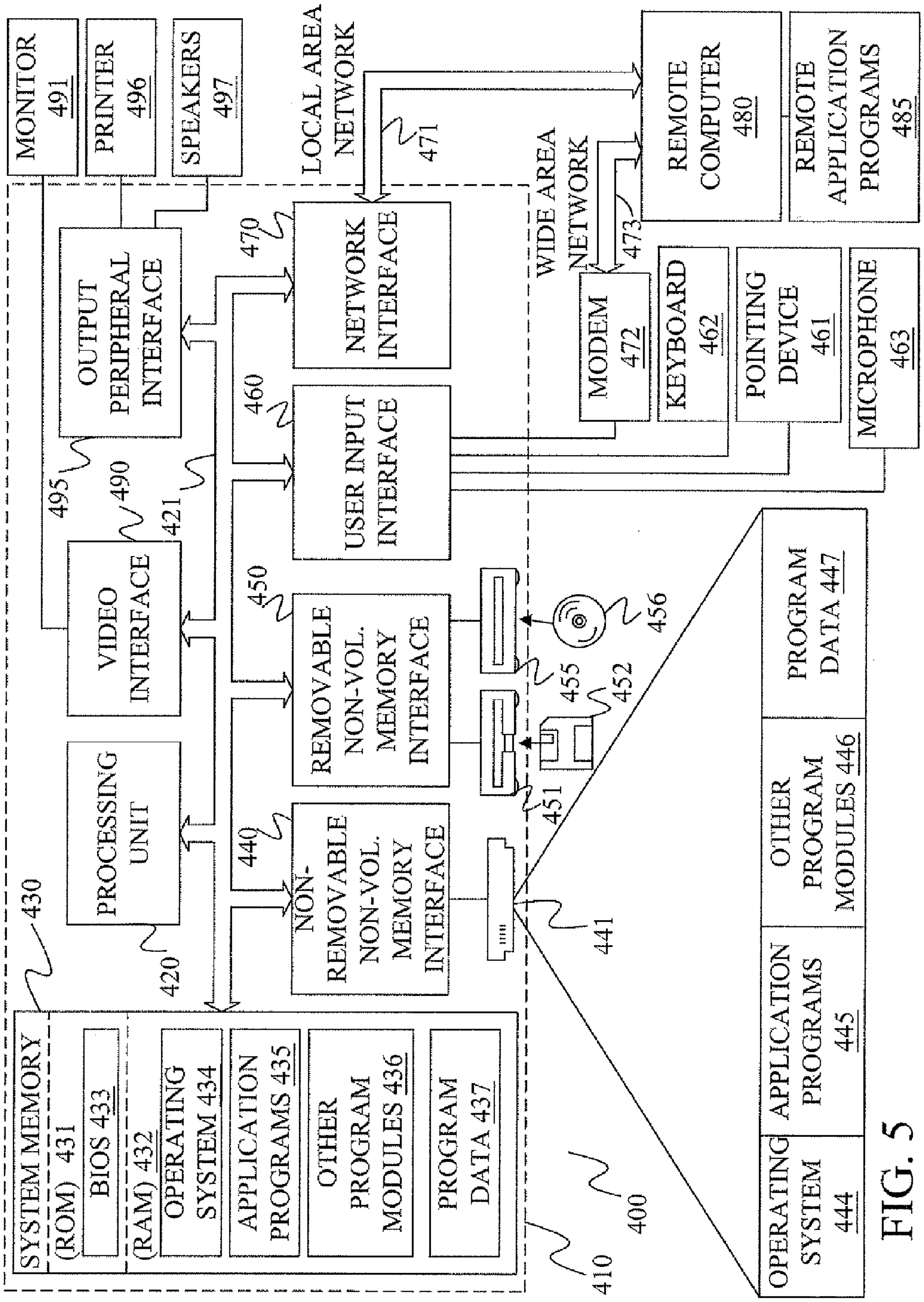
FIG. 5 is a block diagram of one embodiment of a computing environment in accordance with one embodiment.

FIG. 5 illustrates an example of a suitable computing system environment 400 on which embodiments may be implemented. Noise reduction components can be generated by any suitable program either local to, or remote from, computing environment 400. Similarly, model 120 and noise reduction components 210 and 302 can be stored in any desired memory (discussed below). The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 5, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 5 illustrates operating system 434, application programs 435, other program modules 436, and program data 437.

The computer 410 may also include other removable/non-removable volatile/nonvolatile computer storage media. By way of example only, FIG. 5 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 5, provide storage of computer readable instructions, data structures, program modules and other data for the computer 410. In FIG. 5, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 5 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 5 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A speech system, comprising:

a feature extractor receiving a noisy speech signal and extracting noisy speech features from analysis frames of the noisy speech signal, each analysis frame being comprised of a plurality of samples of the noisy speech signal;

a noise reduction component receiving the noisy speech signal and the noisy speech features and applying a time varying noise model, that models noise as the noise varies from sample-to-sample, to the noisy speech features to obtain enhanced speech features; and a speech component performing a speech-related function based at least on the enhanced speech features.

2. The speech system of claim 1 wherein the speech component comprises:

a decoder in a speech recognition system configured to generate a speech recognition result based on the enhanced speech features.

3. The speech system of claim 1 wherein the speech component comprises:

a synthesizer in a speech enhancement system configured to generate enhanced speech based on the enhanced speech features.

4. The speech system of claim 1 wherein the time-varying noise model generates a noise estimate corresponding to a portion of the noisy speech signal that has a duration of less than 25 milliseconds.

5. The speech system of claim 4 wherein the time-varying noise model generates a noise estimate corresponding to a portion of the noisy speech signal that has a duration of approximately every 62 microseconds.

6. The speech system of claim 1 wherein the time-varying noise model comprises a sequence of Mel-Frequency Cepstral Coefficient means and covariances generated from spectrally filtered speech samples.

7. A computer-implemented method of performing a speech-related function based on a noisy speech signal, using a computer with a processor, the method comprising:

receiving the noisy speech signal at the processor;

extracting, with the processor, noisy speech features from analysis frames of the noisy speech signal, each analysis frame being comprised of a plurality of samples of the noisy speech signal;

applying, with the processor, a time-varying noise model, that models noise as the noise varies from sample-to-sample, to the noisy speech features extracted from the noisy speech signal to obtain enhanced speech features; and performing the speech-related function based at least on the enhanced speech features.

8. The computer-implemented method of claim 7 and further comprising:

dividing the noisy speech signal into the analysis frames.

9. The computer-implemented method of claim 7 wherein performing the speech-related function, comprises:

generating a speech recognition result recognizing speech in the noisy speech signal, based on the enhanced speech features.

10. The computer-implemented method of claim 7 wherein performing the speech-related function, comprises:

generating enhanced speech with a speech synthesizer, based on the enhanced speech features.

11. The computer-implemented method of claim 7 wherein applying the time-varying noise model, comprises:

generating a noise estimate corresponding to a portion of the noisy speech signal that has a duration of less than 25 milliseconds.

12. The computer-implemented method of claim 11 wherein applying the time-varying noise model, comprises:

generating a noise estimate corresponding to a portion of the noisy speech signal approximately every 62 microseconds.

13. The computer-implemented method of claim 8 wherein the noisy speech signal is an analog signal and wherein dividing the noisy speech signal into analysis frames comprises:

generating digital samples of the analog speech signal with an analog-to-digital converter at a predetermined sampling rate.

* * * * *